United States Patent [19]

Abela

[11] Patent Number: 6,085,963
[45] Date of Patent: Jul. 11, 2000

[54] WORK PIECE REPAIR

[75] Inventor: Stewart Ernest Abela, Dyce, United Kingdom

[73] Assignee: BGM (Patents) Limited, Aberdeen, United Kingdom

[21] Appl. No.: 08/973,739

[22] PCT Filed: May 26, 1995

[86] PCT No.: PCT/GB95/01211

§ 371 Date: Sep. 4, 1998

§ 102(e) Date: Sep. 4, 1998

[87] PCT Pub. No.: WO95/32831

PCT Pub. Date: Dec. 7, 1995

[30] Foreign Application Priority Data

May 26, 1994 [GB] United Kingdom ............... 9410622
Mar. 2, 1995 [GB] United Kingdom ............... 9504211

[51] Int. Cl.$^7$ ............... B23K 31/00; B23K 31/02
[52] U.S. Cl. ............... 228/119; 228/119; 428/558
[58] Field of Search ............... 228/119; 219/77, 219/76.14; 29/402.16

[56] References Cited

U.S. PATENT DOCUMENTS

| | | | |
|---|---|---|---|
| 604,569 | 5/1898 | Ringström | 219/77 |
| 1,342,801 | 6/1920 | Gebauer | 219/77 |
| 4,011,918 | 3/1977 | Jurgens | 175/325 |
| 4,156,374 | 5/1979 | Schwayder | 76/108 A |
| 4,243,727 | 1/1981 | Wisler et al. | 428/558 |
| 4,277,108 | 7/1981 | Wallace | 308/4 A |

FOREIGN PATENT DOCUMENTS

| | | | |
|---|---|---|---|
| 417731 | 3/1991 | European Pat. Off. | 428/558 |
| 26 07 763 | 9/1976 | Germany | 228/119 |

*Primary Examiner*—Patrick Ryan
*Assistant Examiner*—Lynne Edmondson
*Attorney, Agent, or Firm*—Lalos & Keegan

[57] ABSTRACT

A method of repairing a worn surface of a work piece especially but not exclusively a fin surface of a down hole stabilizer tool basically comprising placing an array of hard wearing trapezoids e.g. of tungsten on the surface to be repaired and occupying the space between the trapezoids by a filling applied by a relatively low temperature fusion welding process, preferably using a MAG welding technique. The welding temperature, for example less than 250° C., can be well below the tempering temperature of the treated material e.g. steel, and this avoids harmful effects to the steel material. The worn surface can be dressed as a preliminary if necessary before the repair treatment proper. Additional layers are possible in the form of (a) matrix and (b) an initial buffer layer between the filling and the treated surface, the latter (b) again being applied by low temperature fusion welding but the former (a) can be applied by brazing. It is beneficial for the trapezoids to be arranged inclined relative to an axial direction of the surface being repaired. The present repair method is usable both for magnetic and non-magnetic steels.

24 Claims, 9 Drawing Sheets

(MAGNETIC)
STABILIZER REPAIR WITHOUT TUNGSTEN CARBIDE MATRIX (MAGNETIC)
STABILIZER REPAIR WITHOUT BUFFER LAYER (MAGNETIC)
STABILIZER REPAIR WITH BUFFER LAYER (NON-MAGNETIC STABILIZER)
WITHOUT TUNGSTEN CARBIDE MATRIX (NON-MAGNETIC STABILIZER)
WITH TUNGSTEN CARBIDE MATRIX

COMPOSITION OF COPPER ALLOY SUITABLE
AS WELDING WIRE FOR FUSION LAYERS

CHEMICAL ANALYSIS WT %

| CAST N° | C | Si | Mn | S | P | Cr |
|---|---|---|---|---|---|---|
| T 0932 |  | 3.25 | 1.05 |  | 0.008 |  |
|  | Mo | Nb | Cu | Co | Al | Fe |
|  |  |  | 95.5 |  | <0.01 | 0.031 |
|  | Ta | V | N | Mg | Zn | As |
|  |  |  |  |  | 0.052 | <0.01 |
|  | Pb | Ni | Ti | Bi | Sn |  |
|  | <.005 | <.005 |  | <.005 |  | <0.01 |

FERRITE CONTENT USING SCHAEFFLER/DELONG FORMULA

Fig. 12 (TABLE A)

COMPOSITION OF FERROUS ALLOY SUITABLE
AS WELDING WIRE FOR BUFFER LAYER

| CHEMICAL ANALYSIS WT% | | | | | | |
|---|---|---|---|---|---|---|
| CAST № | C | Si | Mn | S | P | Cr |
| V1832 | 0.035 | 0.54 | 5.83 | 0.009 | 0.018 | 17.26 |
| | Mo | Nb | Cu | Co | Al | Fe |
| | 0.15 | 0.01 | 0.10 | 0.038 | 0.003 | BAL |
| | Ta | V | N | Mg | Zn | As |
| | | | 0.027 | | | |
| | Pb | Ni | Ti | Be | | |
| | | 7.70 | 0.005 | | | |
| FERRITE CONTENT USING SCHAEFFLER/DELONG FORMULA 8% | | | | | | |

Fig. 13 (TABLE B)

WORK PIECE REPAIR

The present invention relates to a repair procedure for use in work pieces and especially but not exclusively with drill stem stabilisers as used in drilling equipment for the exploitation of natural oil and gas reserves.

The traditional method of repairing worn drill stem stabilisers involves the use of a flame brazing technique, the flame typically being generated by the combustion of a mixture of oxygen and acetylene. The worn area is subjected to the heat generated by the brazing technique prior to tungsten carbide trapezoids being placed, in an ordered formation, upon the heated area. The trapezoids are subsequently surfaced with a brazing material impregnated with small tungsten carbide particles sufficient to cover the area of the repair.

The process employs a high heat input which can exceed that recommended for the drill stem material. This excess heat can have an adverse effect on the structural integrity of the stabilizer as well as reducing its resistance to wear by abrasion. Further, considerable time was required to apply this method in a repair.

It is the object of the present invention to obviate and/or mitigate the aforementioned disadvantages associated with this type of repair procedure.

According to a first aspect of the present invention there is provided a method of repairing a worn work piece comprising locating a plurality of hard wearing elements in spaced array on the surface of a metal work piece to be created and applying filling material in the space between the elements by a relatively low temperature fusion welding process.

According to a second aspect of the present invention a method of repairing a worn work piece especially a drill stem stabilizer of a downhole tool comprises applying a buffer layer to the zone to be repaired by means of a relatively low temperature fusion welding process; fitting a plurality of elements of hard wearing material on the buffer layer; providing a filling between the elements preferably by the aforesaid fusion welding process; and applying surfacing of suitable material over the filling.

Preferably the fusion welding temperature is substantially below the tempering temperature of the work piece being treated.

The fusion welding process is preferably in the form of a semi-automatic metal active gas process (MAG). The initial (pre) heating of the zone to be treated can be carried out at a temperature less then 100° C. and preferably about 50° C. The hard wearing elements preferably comprise tungsten carbide members of trapezoidal form.

A retainment, for example of bar form, can be located around the periphery of the zone where the buffer layer is to be applied; to facilitate buffer layer formation. The welding process can use argon as a shielding gas for the weld pool. The filler material can be of any suitable material and copper, aluminium and bronze materials are possibilities for use in this material The surfacing can include brazing and tungsten particles.

The surfacing can be applied by a brazing process, and there should be no real harmful effect as the brazing in this case is onto the buffer or fill layers away from the basic fin metal.

The work piece repair method in accordance with the present invention can be used in the treatment of work pieces both of magnetic steel e.g. with a percentage composition C: 0.410; Mn 0.940; Si: 0.240; S: 0.021; P; 0.011; Ni 0.180; Cr: 1.120; Mo: 0.230; Cu: 0.210 and non-magnetic steel e.g. with a percentage composition C: 0.025; Mn: 20.51; Si: 0.46; Cr; 12.57; Mo: a 13; Ni: 0.10; No: 0.28.

According to a further aspect of the present invention in a repair method of a zone of a work piece having an exially extending path, especially a stabiliser fin extending axially on a downhole tool, a plurality of hard wearing elements, for example of trapezoidal form, are set in an array extending at an angle to said axially extending path of the work piece zone.

The present invention is also a work piece with hard wearing elements of a repair arranged as above.

Embodiments of the present invention will now be described by way of example with reference to the accompanying drawings wherein:

FIGS. 12 and 13 are cables (A,B) showing the composition of suitable weld treatment materials usable in the invention.

Figure 1:
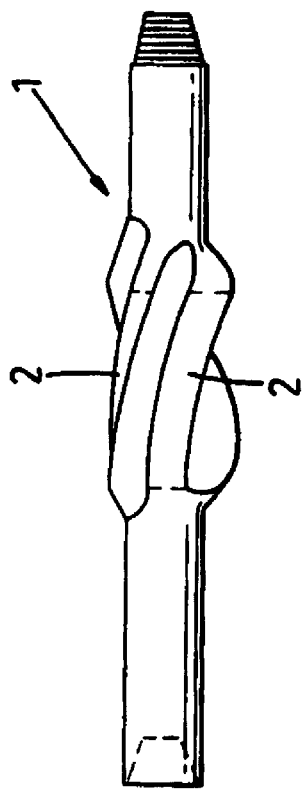
FIG. 1 shows a side view of a downhole drill tool including stabilizer fins at the drill stem.

FIG. 1 shows a drill tool 1 as used with a drill string (not shown) in downhole work in oil or gas exploitation. To facilitate operations, the drill tool 1 is fitted with a drill stem stabiliser in the form of blades or fins 2 extending helically along the tool: the stabiliser provides stability and rigidity to the tool and can also serve for centering of the tool in the bore. The tool 1 and the stabiliser fins 2 are made from special tool steel e.g. chromalloy steel. However the environment in which the tool operates is usually so hostile that within a short period of time the stabiliser fins 2 become unacceptably worn due to abrasive action. There is now described a procedure in accordance with the present invention for repairing such a tool stabiliser fin 2.

Figure 2:
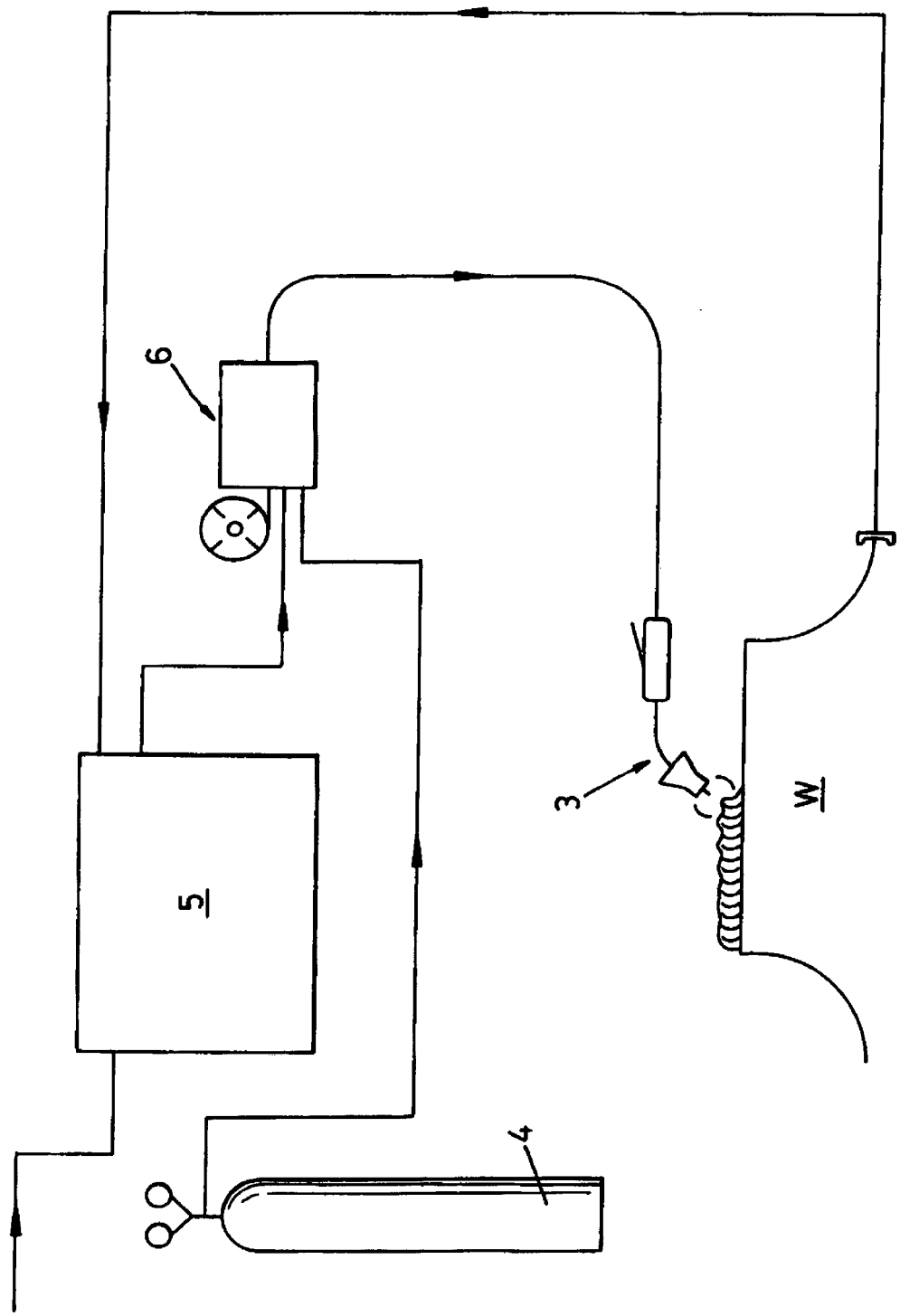
FIG. 2 shows schematically apparatus for carrying out a semi-automatic active gas welding process (MAG) as used in the present repair method.

A significant facet of the repair procedure is the use of a semi-automatic metal active gas welding process (MAG) (generally and more commonly referred to as gas metal arc welding (GMAW)) in the repair, and suitable apparatus for carrying out such a welding process is shown schematically in FIG. 2. Thus a welding gun 3 is provided and welding is achieved by relative reciprocating motion between the gun 3 and the workpiece W. Argon is preferably used as the shielding gas and is supplied from a cylinder 4. The electricity power source 5 and electrode wire feed device 6 automatically passing electrode wire to the gun 3 are shown, the argon gas being passed with the wire to the gun 3. The operator holding the gun 3 controls the welding operation and in particular by moving the gun 3 over the work piece controls the deposits of weld material on the work piece.

Figure 4:
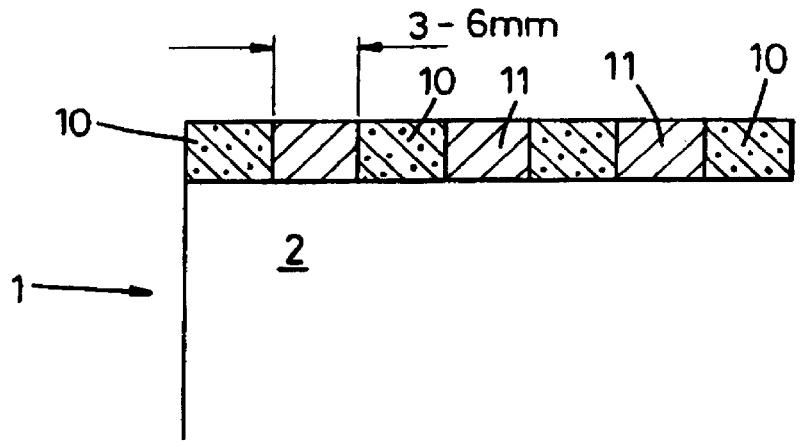
FIG. 4 shows a sectional elevation (A—A of FIG. 10) of part of a stabiliser fin of magnetic steel repaired in accordance with one embodiment of the present invention.

Referring to FIG. 4, the stabilizer fin 2 of the stabiliser tool; 1 had its worn outer surfaces repaired by a repair method in accordance with a first embodiment of the present invention, the tool (and fin) being made from magnetic steel with a composition for example as previously specified. As a first step in the method a series of hard wearing elements 10 of trapezoidal fort and made for example from tungsten are arranged in spaced array (See FIG. 10) on the outer surface of the fin 2, and the elements 10 can be located by an initial localised welding operation to facilitate the further steps in the repair method. If necessary the surface being treated can be dressed as a preliminary step co facilitate the placement of the elements 10, The space between the elements is filled with material 11 by fusion welding of a copper alloy such as the material sold under the trade name Gricu Sima. FIG. 12 shows a typical composition of the material 11. The fusion welding is preferably carried out by the use of a semi-automatic gas welding process (MAG) as described above. The temperature of the fusion welding process is at a level (i.e. no more than about 250° C.) substantially less than the tempering temperature of the steel work piece 1 (about 650° C.). This repair method enables the repair to be effected very quickly indeed in comparison with prior art methods and there is less likelihood of damage to the work piece.

Figure 5:
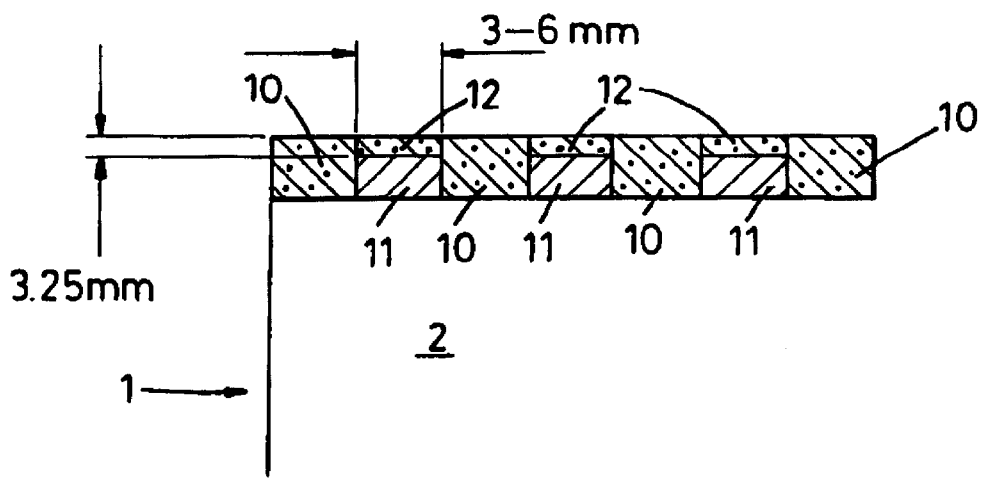
FIG. 5 shows a similar view of a further embodiment of the repair method for a magnetic steel stabiliser, including an additional surface layer or matrix.

FIG. 5 shows a repair with a generally similar treatment to that described for FIG. 4, and again for a magnetic alloy steel but in this case additional surfacing material 12 is applied in the form of a tungsten carbide matrix. The surfacing 12 can be applied by a brazing operation utilising tungsten particles.

Figure 3:
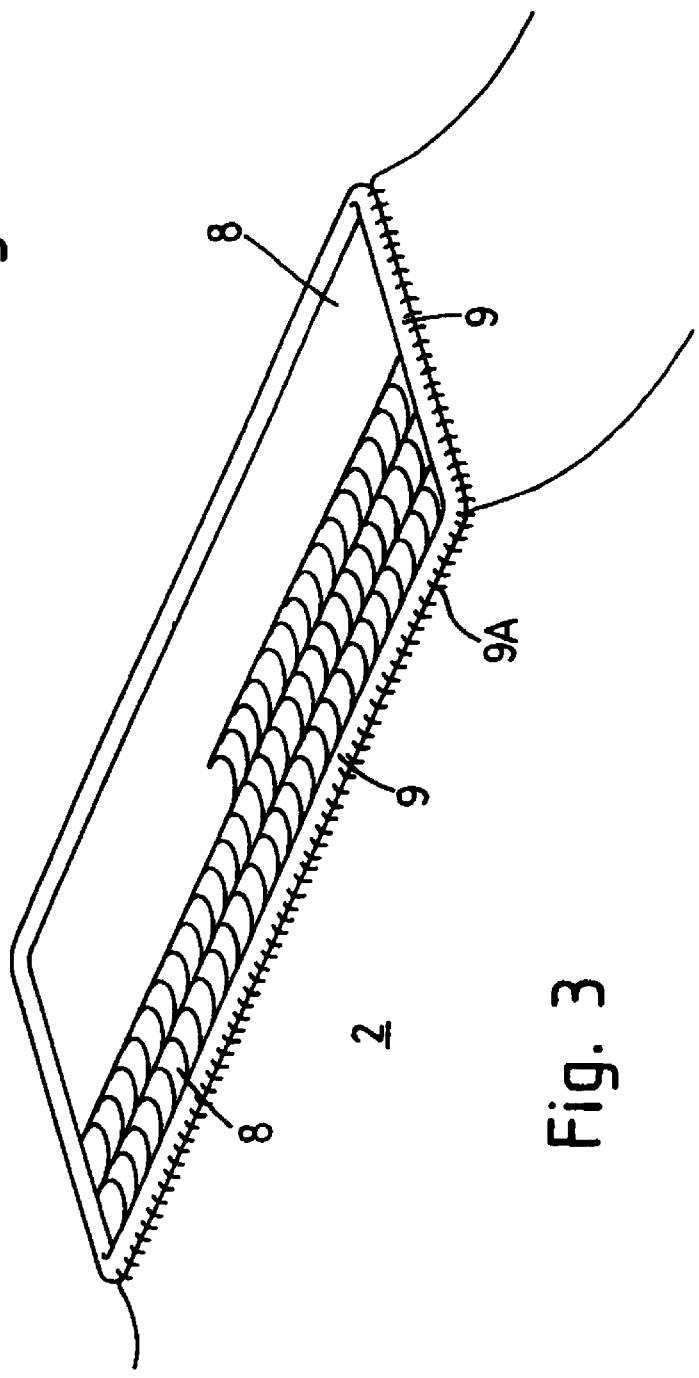
FIG. 3 shows pictorially a stabiliser fin under repair in accordance with the prevent invention.
Figure 6:
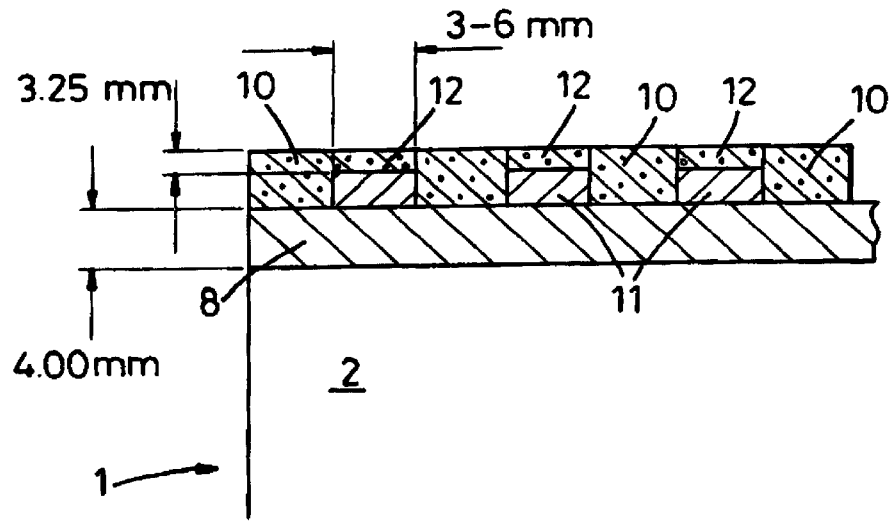
FIG. 6 shows a further embodiment of the repair method, in this case including a buffer layer in addition to the surface matrix.

FIG. 6 shows a stabiliser 1 located similarly as in FIG. 4, but wherein initially a buffer layer 8 is applied to the surface to be treated. The buffer layer 8 is preferably formed by a "buttering" action (see FIG. 3) by virtue of relative reciprocating motion between the weld gun 3 and the work piece, in this first step minimal pre-heating of the repair zone is present e.g. to 50° C. and in the formation of this layer a in this way weld material such as detailed in FIG. 12 e.c. Gricu Sima (by Messrs. Griesheim) is beneficially used. This contrasts sharply with the previous brazing repair technique of the prior art where temperatures in excess of 660° (i.e. to red heat) were used. The high temperature, above the steel tempering temperature has resulted in the repaired fin being prone to cracking and wear, due to high stress concentrating resulting from the high temperature heating, The depth of the buffer layer 8 can be selected to enable the treated surface to be built up conveniently to the desired level ir the repair process. In subsequent repair treatments to the stabiliser 1 the barrier layer 8 may be left substantially intact with the layers 11 and 12 and the elements 10 removed prior to a fresh repair.

Figure 7:
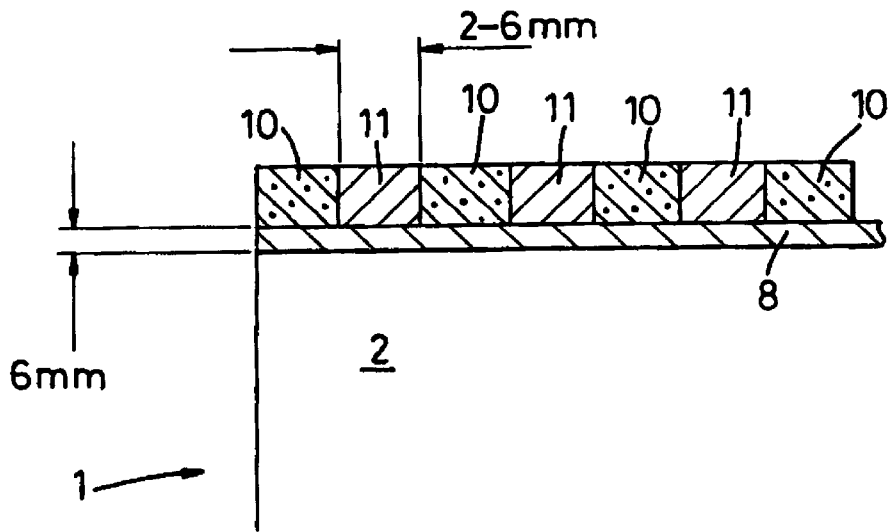
FIGS. 7 and 8 show yet further embodiments of the repair method, in this case for a stailiser of non-magnetic steel.
Figure 8:
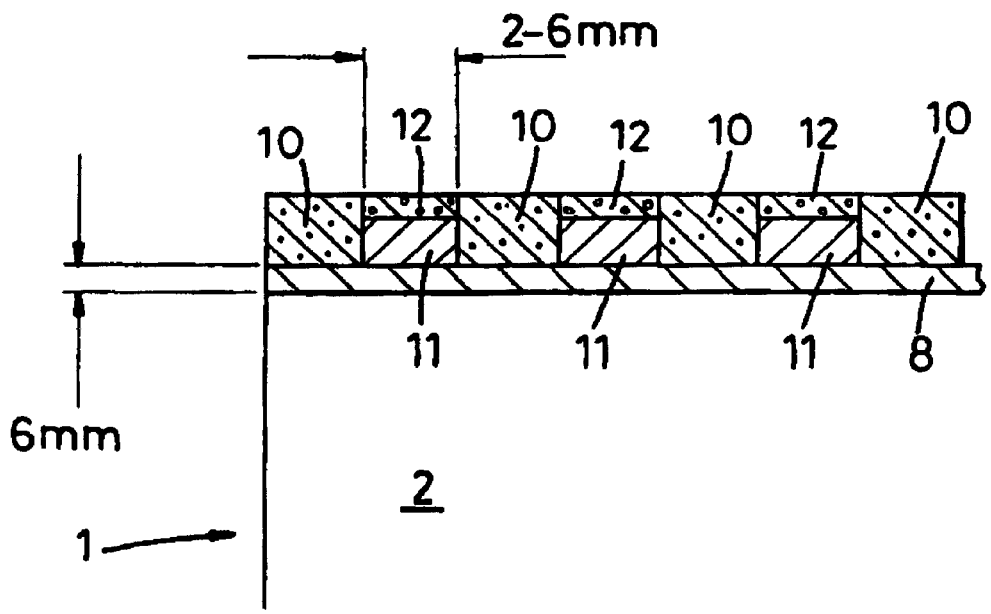

FIGS. 7 and 8 show the repair process of the invention as applied to a stabiliser 1 of non-magnetic steel material, FIG. 8 including the outer tungsten carbide matrix 12 and FIG. 7 without.

The various layers 8, 11 and 12 are applied in the manner for the previous embodiments For non-magnetic steel, it would not be compatible to use a base buffer layer of a material with high copper content. Consequently in this case the buffer layer 8 is formed from a ferrous alloy material again in welding wire form, Table B of FIG. 13 showing a possible composition of such an alloy. A suitable material is that supplied under the trade name Grinox 307-MN.

The spacing of the elements 10 is suitably chosen and may be for example 2–6 mm, while the depth of the layer 12 may be about 3.25 mm, and the buffer layer 8 could be up to 6 mm or 8 mm in depth. The outer surface of the treatment formation (11, 12) is ground or buffed down to give the level form shown.

Figure 9:
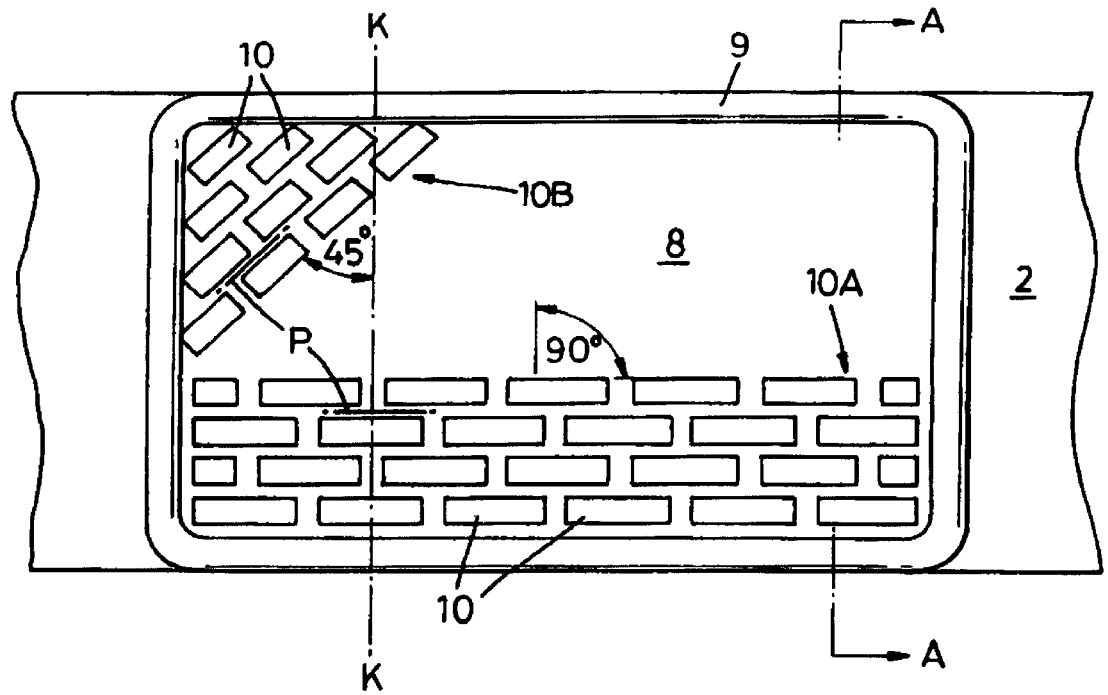
FIG. 9 shows a plan view of FIG. 3 but with a longitudinally extending array of tungsten trapezoids positioned and also an array of these trapezoids arranged in an inclined manner.
Figure 11:
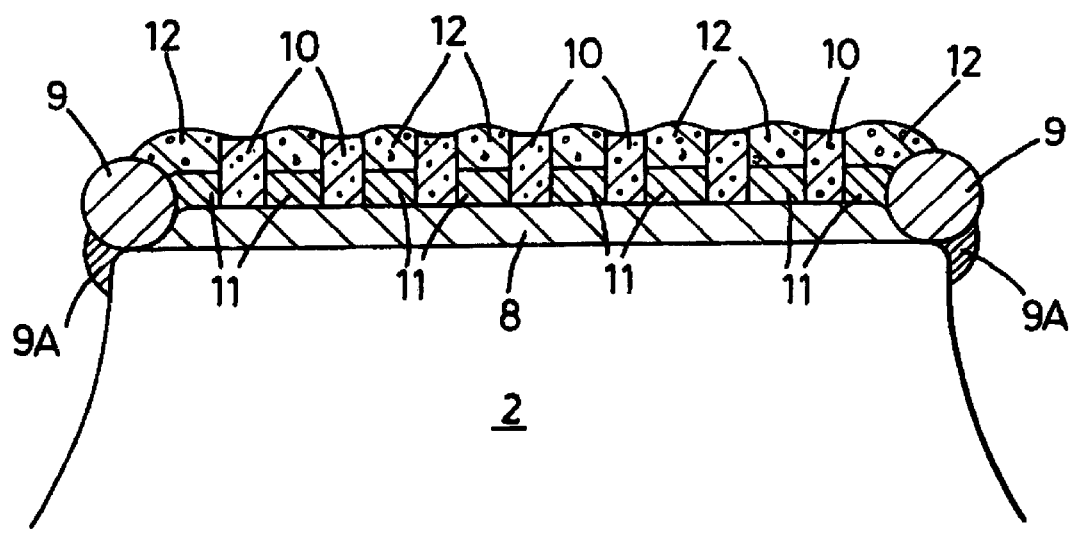
FIG. 11 shows a sectional end view of the completed repair through section A—A of FIG. 9.

Referring now to the embodiment of FIGS. 9 and 11 concerning the repair of a stabiliser fin, the first stage in the repair procedure of this embodiment is to apply a buffer layer 8 utilising the above semi-automatic metal active gas (MAG) welding process on the zone of the fin 2 to be repaired. To facilitate this work a retainment 9 in the form of a round bar is located at the periphery of the repair zone by means of welds 9A. The buffer layer 8 is formed by a "buttering" action (see FIG. 3) as previously described by virtue of the relative reciprocating motion between the weld gun 3 and the work piece. In this first step, minimal pre-heating of the repair zone is utilised e.g. to 50° and in the formation of the layer 8 in this way, Gricu Sima (Messrs. Griesheim) weld material is beneficially used.

The next stage in the process is the placement of a plurality of tungsten carbide elements 10 of trapezoidal form on the buffer layer 8 and then to provide a filling 11 between the elements 10, this filling 11 also being applied by the semi-automatic metal active gas (MAG) welding process. As can be seen in FIG. 9. the elements 10 are arranged in a "Brickwork" form array. The repair is completed by the application of a surfacing 12 which can be achieved by brazing the surfacing 12 comprising brazing and tungsten particles. The use of brazing for the surfacing will have no real harmful effect as the brazing action is onto the buffer or fill layers (away from the fin metal) and therefore essentially onto copper material.

The products used in the MAG welding process can be as follows:

| Shielding Gas | 99.9% Argon, |
|---|---|
| Filler Material | Gricu S-Sima (Griesheim) |
| (consumable) | DIN 1733 SGSi 3 |
| | AWS/ASME SFA- 56/57/5.27 |
| | ER Cu Si - A |

It is possible that a variety of Cu/Al/Bronze filler materials could be used advantageously, all materials with a relatively high heat conductivity.

Figure 10:
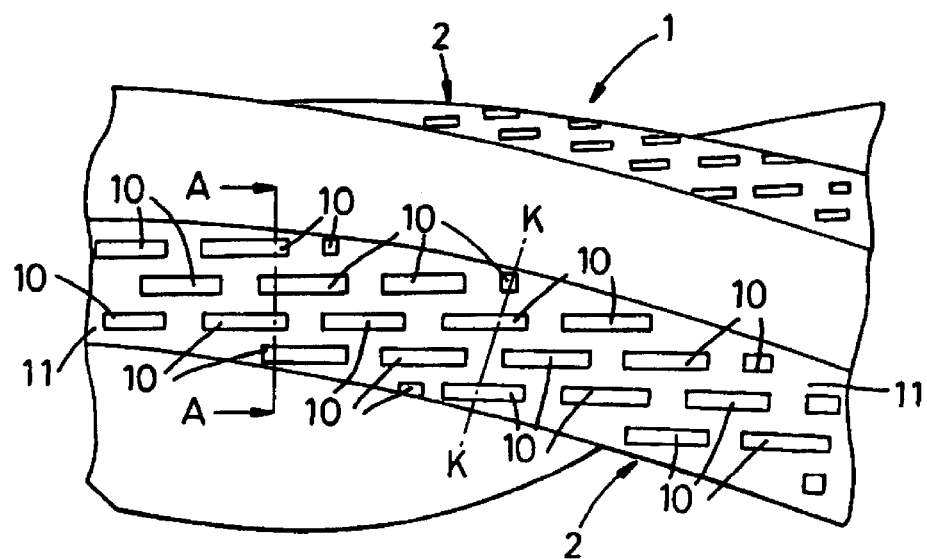
FIG. 10 shows a portion of the drill tool of FIG. 1 to a larger scale with the inclined trapezoids of FIG. 9 present.

Referring to FIG. 9. the element 10 are shown in the conventional brickwork array 10A wherein the elements 10 extend essentially at right angles to a line K—K extending transversely across the fin 2. However, a further array 10B is proposed where the element array is inclined at an acute angle to this direction K—K; this has the benefit of reducing the erosion rate of the filling 11. FIG. 10 shows the stabiliser fin 2 with such an inclined array of elements 10. In particular the erosion of the filling 11 via the paths P between the element rows will be substantially less for the inclined element 10B than for the element arrangement 10A. The angle of inclination will be set to give optimum results.

The above repair process according to the various embodiments of the present invention has the following advantages over the previous brazing technique:
1. The repair time can be substantially reduced for example by a factor of between 40–60% or even greater.
2. There is substantially less heat input to the fin which has a beneficial effect on the repair. The heat input can be no greater than effected by a temperature of 250° C. The repair zone will remain in an acceptable range in accordance with NACE standards providing the definite possibility of eliminating the need for any further heat treatment to the steel, thereby reducing associated costs.

3. The hardness figure associated with the previous brazing procedure will be lower than with the present process so enabling the working life of the stabiliser to be increased when the present repair process is used.

4. The previous brazing technique required gas supplies (cylinders) of both acetylene and oxygen, whereas the present process requires only a gas supply of argon for the formation of the buffer and filler layers.

Whereas the above described example is concerned with repairing a drill stem stabilizer it will be understood the repair process of the present invention could be used in repairing other work pieces where appropriate.

A further particular advantage of the present method io that the possibility of crack formation on the work piece at the repair location is virtually eliminated, especially due to the relatively low tempratures used in the process. Also, the likelihood of buckling in certain work pieces (e.g. collars) which could result when high temperatures are employed is substantially avoided by the present invention.

What is claimed is:

1. A method of repairing a worn metal work piece comprising locating a plurality of hard wearing elements in spaced array on a base surface of the metal work piece to be treated, and applying a filling in the space between the elements said filling being applied by melting a supply of filling material at a temperature not greater than the tempering temperature of the work piece material and depositing the molten material so as to fill said space between said hard wearing elements with said filling material and so that the filling material is welded to the base surface.

2. The method as claimed in claim 1, wherein the filling material has no more than a minimal ferrous content.

3. The method as claimed in claim 2, wherein the filling material is a material with a high heat conductivity.

4. The method as claimed in claim 1, wherein said filling is applied utilising a metal gas welding process.

5. The method as claimed in claim 1 wherein as a preliminary step a buffer layer is applied to the work piece surface by a fusion welding type process at a temperature not greater than the tempering temperature of the work piece material, the hard wearing elements being placed on said buffer layer and said filling material applied between the elements.

6. The method as claimed in claim 1, wherein an additional surface layer is applied on top of said filling material.

7. The method as claimed in claim 4, wherein said welding process is a semi-automatic welding process.

8. The method as claimed in claim 6, wherein the additional surface layer is applied by brazing.

9. The method as claimed in claim 6, wherein the additional surface layer includes any of brazing and tungsten particles.

10. The method as claimed in claim 5, wherein a retainment is provided at the periphery of the zone to be treated to facilitate the buffer layer formation.

11. The method as claimed in claim 2, wherein copper alloy wire is used as the filling material.

12. The method as claimed in claim 2, wherein the filling material includes any of copper, aluminium and bronze materials.

13. The method as claimed in claim 1, wherein the hard wearing elements comprise tungsten carbide members of trapezoidal form.

14. A repair of a zone of a work piece having an axially extending path, including a plurality of hard wearing elements located on the work piece at said zone, the hard wearing element being set in an array extending at an acute angle to said axially extending path of the work piece zone.

15. The method as claimed in claim 14, wherein the space between the hard wearing element is filled by filling material applied between the hard wearing elements.

16. The method as claimed in claim 14, wherein additional layers are provided comprising (a) a buffer layer between the filling material and the work piece and (b) a surface layer on top of the filling material.

17. The method as claimed in claim 16, wherein any of the filling and the buffer layer are formed by a fusion welding process.

18. The method as claimed in claim 17, wherein the fusion welding temperature is substantially below the tempering temperature of the work piece being treated.

19. A method of applying a hard wearing surface to a work piece, comprising locating hard wearing elements in spaced array on a base surface of the work piece, and applying a filling in the spaces between the hard wearing elements, said filling being applied by an inert gas shielded welding process such that a supply of filling material is melted at a temperature not greater than 250° C. and deposited in molten condition on the work piece so as to fill the spaces between the hard wearing elements, and so that the filling material is welded to said base surface.

20. A work piece including a hard wearing surface comprised by hard wearing elements in spaced array and filler material filling the spaces between the hard wearing elements the filling being applied by a fusion welding process at a temperature less than the tempering temperature of the work piece material.

21. A work piece as claimed in claim 20, wherein the hard wearing elements are set in an array extending at an angle to an axially extending path on the work piece.

22. A work piece as claimed in claimed in claim 20, wherein a buffer layer is present below said filling material.

23. A work piece as claimed in claim 20, wherein an additional surface layer is present on top of said filling material.

24. A work piece including a hard wearing surface comprised by hard wearing elements arranged in spaced array on the work piece with the spaces between said elements filled by filling material, the filling material being applied by an inert gas shielded welding process at a temperature no greater than 250° C.

* * * * *